United States Patent [19]
Komoto

[11] Patent Number: 5,184,690
[45] Date of Patent: Feb. 9, 1993

[54] ELECTRONIC BALANCE
[75] Inventor: Akira Komoto, Otsu, Japan
[73] Assignee: Shimadzu Corporation, Kyoto, Japan
[21] Appl. No.: 661,955
[22] Filed: Feb. 27, 1991
[30] Foreign Application Priority Data
Feb. 28, 1990 [JP] Japan .................... 2-50229
[51] Int. Cl.⁵ .............................. G01G 7/00
[52] U.S. Cl. ........................ 177/212; 177/210 EM
[58] Field of Search ............... 177/212, 210 EM
[56] References Cited
U.S. PATENT DOCUMENTS

| 3,786,883 | 1/1974 | Kunz | 177/212 X |
| 4,245,711 | 1/1981 | Kunz | 177/212 |
| 4,627,505 | 12/1986 | Kunz | 177/212 X |
| 4,875,534 | 10/1989 | Kunz | 177/212 |
| 5,115,877 | 5/1992 | Komoto | 177/212 |

*Primary Examiner*—George H. Miller, Jr.
*Attorney, Agent, or Firm*—Nikaido, Marmelstein, Murray & Oram

[57] ABSTRACT

In a PID-controlled electronic balance consisting essentially of a weighing pan, a pan stopper for defining the lowest position of the weighing pan, a displacement detector for detecting the displacement of the weighing pan, a PID operation circuit and an electromagnetic force transducer, the PID operation circuit is devised so as to operate, when the weighing pan has its movement kept restricted by the pan stopper, with at least one of the mathematical coefficients increased, the coefficients respectively multiplying the proportionality term integral term and differential term contained in the mathematical operation process carried out by the PID operation circuit.

3 Claims, 2 Drawing Sheets

ELECTRONIC BALANCE

BACKGROUND OF THE INVENTION

The present invention relates to an electronic balance in which a weight to be measured is counterbalanced automatically with a force produced by an electromagnetic force transducer.

Such an electronic balance is basically constituted with a self-equlibrating servomechanism consisting essentially of a weighing pan, a pan displacement detector for detecting the displacement of the weighing pan, a PID control system and an electromagnetic force transducer having its constituent movable force coil mechanically connected with the weighing pan. The PID control system contains a PID operation circuit, which outputs a PID control signal by computing and summing up a proportionality signal (P) proportional to an instantaneous value of, an integral signal (I) proportional to a time-integrated value of and a differetial signal (D) proportional to a differentiated value of the output from the tray displacement detector. In addition to the above basic constitution, the balance is provided with a pan stopper for mechanically restricting, when the balance is loaded with a large weight, the displacement of the weighing pan within a limited region. Without the pan stopper, a too large displacement of the weighing pan may cause the balance to give an erroneous measurement due to an elastic after-effect produced in the mechanism of the balance owing to a large distortion of the same.

However, the restriction on the movable range of the weighing pan causes a disadvantage that it takes a long time for the balance, when loaded with a large weight, to be brought into an equlibrium state. While the weighing pan has its displacement limited by the pan stopper, the output from the pan displacement detector remains at a value restricted by the pan stopper, irrespective of the magnitude of a weight placed on the weighing pan. Accordingly, because the PID operation circuit operates with an input signal smaller than that expected if the weighing pan is freely displaced meeting the weight placed thereon, it takes a long time for the electromagnetic force transducer to produce a force enough to compensate the large weight on the weighing pan. Such a disadvantage can be eliminated in principle by increasing the gain of the PID operation circuit only while the weighing tray continues to rest on the tray stopper. However, the mehtod of increasing the gain of the circuit is accompanied by a disadvantage that the balance is often caused to get into hunting or irregular flunctuations.

OBJECTS AND SUMMARY OF THE INVENTION

The present invention aims at eliminating the above disadvantage involved in the conventional electronic balance in conjunction with a pan stopper, and makes it an object to provide an improved electronic balance free from the drawback due to the restriction imposed on the movable range of the weighing pan.

Another object of the present invention is to constitute such an improved electronic balance without increasing the gain of the PID operation circuit included in the balance.

To achieve the above objects the invented electronic balance, which is also provided with a PID operation circuit and with a pan stopper, comprises means for detecting whether or not the weighing pan is kept in touch with the tray stopper and means for increasing, only when the weighing pan is kept in touch with the pan stopper, at least the integral-term coefficient to multiply the integral term contained in the mathematical operation carried out by the above PID circuit.

According to the present invention, even if a heavy weight causes the weighing pan to be pushed down to the stopper, the measurement of weight can be made smoothly without response time made increased and without additional fluctuations caused in the process of balancing.

BRIEF DESCRIPTION OF THE DRAWINGS

The present invention is described in further detail in the following on reference to the accompanying drawings, in which.

DETAILED DESCRIPTION OF THE INVENTION

Figure 1:
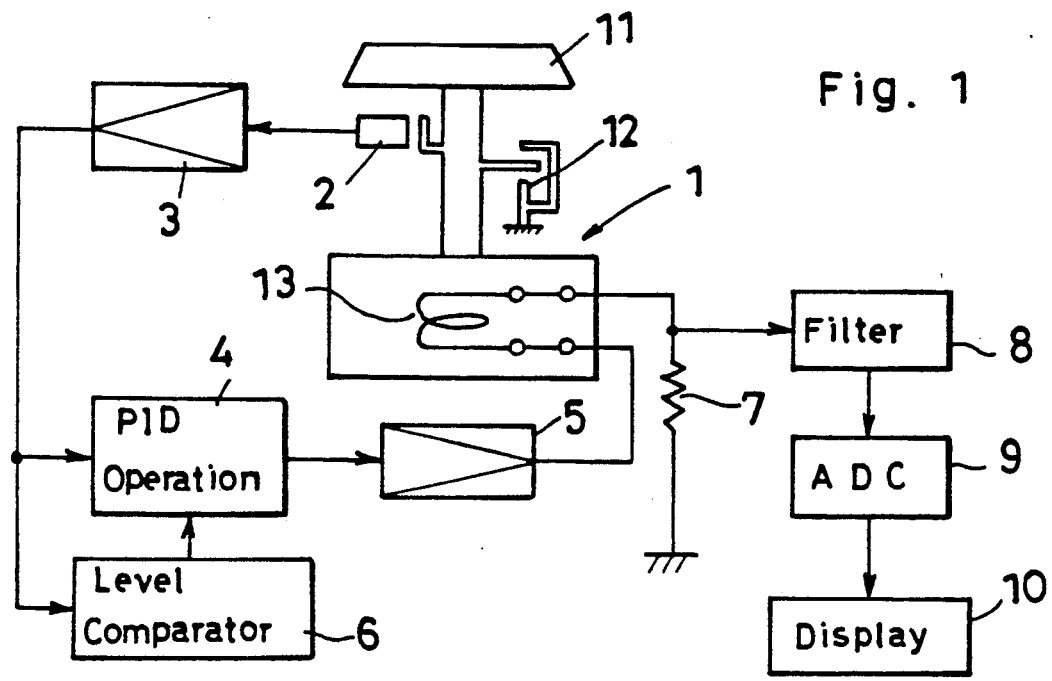
FIG. 1 shows a blockdiagrammatical constitution of an embodiment of the present invention.

Referring to FIG. 1, which is a blockdiagram illustrating the basic constitution of an embodiment of the present invention, an electromagnetic force transducer 1 (whose well-known constitution is symbolically shown only with a movable force coil 13) has its movable force coil 13 mechanically connected with a weighing pan 11 and supplied with a PID-controlled current from a PID operation circuit 4 through a current amplifier 5. The weighing pan 11 has its displacement not only detected by a pan displacement detector 2 but also restricted within a limited region by a pan stopper 12. The output signal of the pan displacement detector 2 is amplified by a preamplifier 3 and then inputted to both a PID operation circuit 4 and a level comparator 6, by which is compared a signal reflecting the displacement of the weighing pan 11 with a reference signal given by a reference signal source built in the level comparator 6. The output of the level comparator 6, inputted to the PID operation circuit 4, modifies the operation of the same in the manner as described later. The PID-controlled current supplied to the force coil 13 developes a corresponding voltage on an output resistor 7. The voltage is transferred through a filter 8 to an analog-to-digital converter 9, which digitalizes the voltages so as to be displayed as a measured value of weight on a digital display 10. In such a basic constitution, the reference signal source built in the the level comparator 6 outputs a voltage slightly lower than that outputted from the preamplifier 3 with the weighing pan 11 pushed down to the allowable lowest position restricted by the pan stopper 12. Therefore, if the weighing pan 11 is pushed down to the above lowest position, the level comparator 6 outputs a signal toward the PID operation circuit 4. This signal acts on the PID operation circuit 4 and increases, for example, the integral-term coefficient to multiply the integral term contained in the mathematical operation carried out by the PID operation circuit 4.

With the embodiment so constituted as described above, if a weight placed on the weighing pan 11 is so light as to keep the displacement of the weighing pan 11 within a region restricted by the pan stopper 12, the PID operation circuit 4 operates normally with the proportionality, integral and differential terms multiplied by their respective predetermined constant coefficients, because the output from the preamplifier 3 is lower than the reference voltage givn by the reference signal source built in the level comparator 6.

Figure 4:
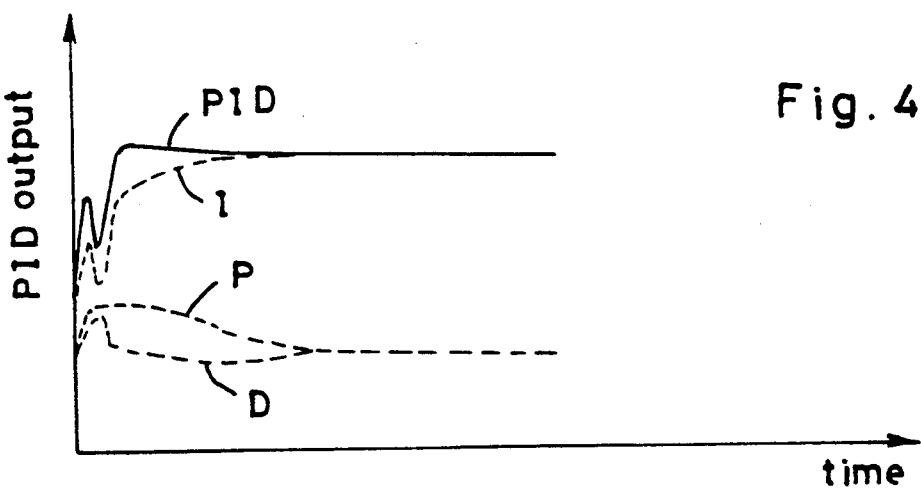
FIG. 4 shows a balancing process of the emodiments of the present invention.
Figure 5:
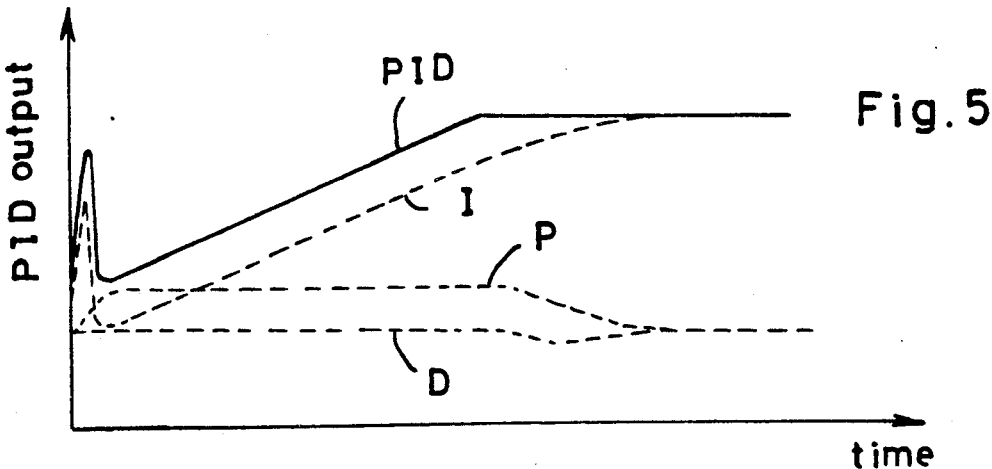
FIG. 5 shows a balancing process of an electronic balance having its PID control system not so devised as in the present invention.

On the contrary, when the weighing pan 11, loaded with a heavy weight, is pushed down to the lowest position restricted by the pan stopper 12, the PID operation circuit 4 operates with the integral-term coefficient increased as described previously, causing an increase in the increasing speed of the PID-controlled current supplied to the force coil 13 of the electromagnetic force transducer 1. Thus, while the weighing pan 11 is kept at the restricted lowest position, the weight is rapidly compensated to rapidly make the weighing pan 11 free from the the pan stopper 12. Once the weighing pan 11 leaves the restriction by the pan stopper 12, the PID operation circuit 4 operates again with an original (not increased) integral-term coefficient to slowly control the balance toward a final equilibrium state. Such an improved balancing process, represented by a resultant PID output curve, is qualitatively illustrated in FIG. 4 in comparison with FIG. 5 which shows a PID output curve expected when the PID operation circuit 4 is not devised so that the integral-term coefficient can be modified. As is clear from the comparison of FIG. 4 with FIG. 5, an electronic balance according to the present invention has its reponse speed largely improved.

This embodiment, in which the integral-term coefficient is changed by a signal from the level comparator 6, can be modified so that the coefficient is changed by means of a purposefully schemed software or in accordance with a contact signal from the pan stopper 12 by constituting the same so as to form a contact switch.

Figure 2:
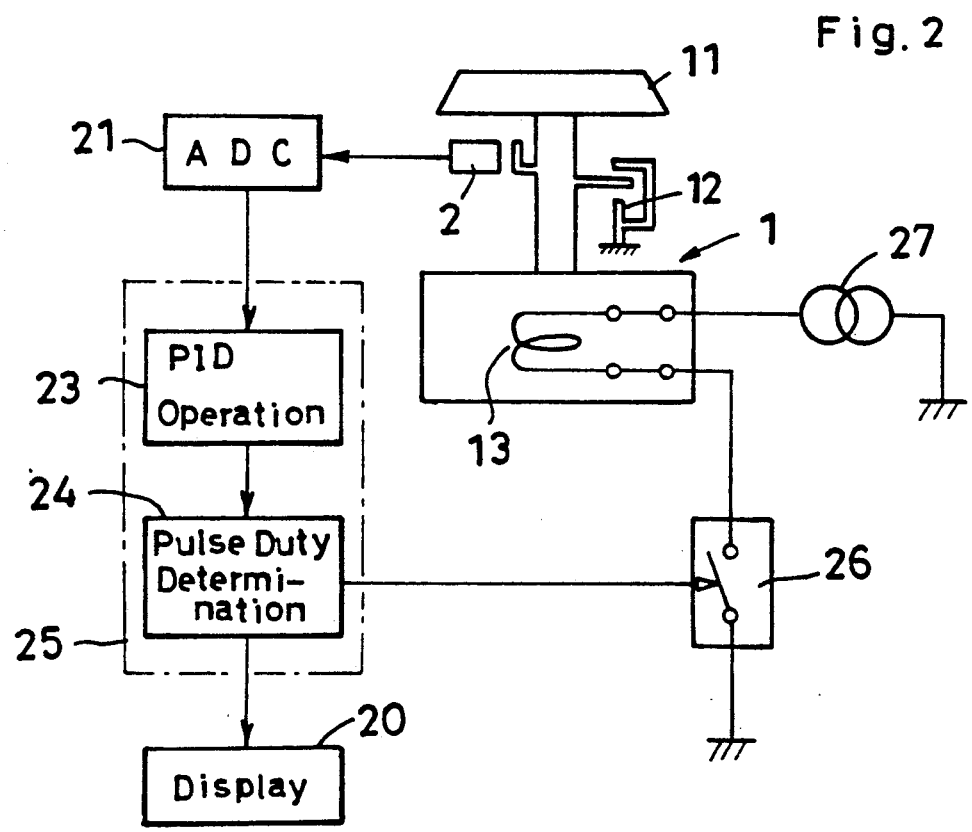
FIG. 2 shows a blockdiagrammatical constitution of another embodiment of the present invention.

As is blockdiagrammatically shown in FIG. 2, the present invention can be applied also to an electronic balance in which is used a digitalized PID operation circuit. In FIG. 2 the same constituents as those shown in FIG. 1 are indicated with the same reference numerals as used in FIG. 1. According to this embodiment the force coil 13 of the electromagnetic force transducer 1 is supplied with a pulse current made by chopping a DC current from a constant DC current source 27 by a switching means 26. The duty factor of the pulse current determines the counterbalancing force generated by the electromagnetic force transducer 1. According to this embodiment a pan displacement detected by the pan displacement detector 2 is converted to digital displacement-data by an analog-to-digital converter 21, and then inputted to a PID operation circuit 23 which outputs a PID control signal. Receiving the PID control signal a pulse duty determination circuit 24, which is microcomputerized (25) together with the PID operation circuit 23, outputs a series of switching signals to operate the switching means 26 so that the the electromagnetic force transducer may have its force coil 13 supplied with a pulsed current whose effective magnitude corresponds to a PID control signal outputted from the PID operation circuit 23.

Figure 3:
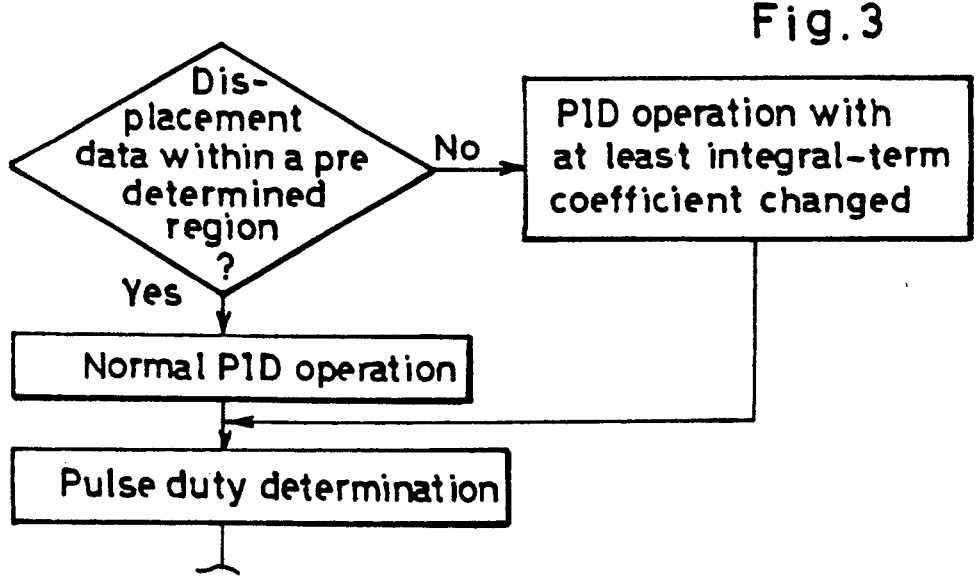
FIG. 3 shows a partial flow chart illustrating the essential function of the embodiment shown in FIG. 2.

With the balance basically constituted as briefed above, if the displacement data outputted from the analog-to-digital converter 21 gives a displacement value corresponding to the state that the weighing pan 11 is pushed down to the lowest position restricted by the tray stopper 12, the PID operation circuit 23 operates with the integral-term coefficient increased by means of a purposefully designed softwar, thus causing response performance of the balance to be improved as similarly as in the case of the previous embodiment shown in FIG. 1. The performance of the integral-term coefficient modication is illustrated also with a partial flow chart shown in FIG. 3.

This embodiment also can be modified so that the integral-term coefficient is changed in accordance with a contact signal from the pan stopper 11 with the same constituted so as to form a contact switch.

Although, in the above embodiments, the PID control modification is achieved by increasing the integral-term coefficient, the present invention can of course be embodied by making the PID operation circuits 4 and 23 operate also with other coefficients increased, such as the proportionality-term and the differential-term coefficients to respectively multiply the proportionality and differential terms contained in the mathematical operation carried out by the PID operation circuits.

Further, the present invention can be embodied in combination with a conventional non-linear control method in which the control system of an electronic balance has its gain varied non-linearly in accordance with a displacement of the weighing tray of the balance.

I claim:

1. An electronic balance comprising:
   a weighing pan for receiving thereon a weight to be weighed;
   a displacement detector for detecting the displacement of said weighing pan and for outputting a displacement signal reflecting the displacement of said weighing pan;
   an electromagnetic force transducer essentially made up of a static-magnetic circuit and a movable force coil movably kept in a magnetic gap provided in said static-magnetic circuit and mechanically connected with said weighing pan;
   a switching means for supplying a pulse current to said movable force coil by switching a constant DC current supplied by a constant DC current source;
   a digital PID operation circuit for outputting a digitalized PID control signal in accordance with said displacement signal;
   a duty factor determining circuit for determining the duty factor of said pulse current so that said pulse current has its effective magnitude made to correspond to said PID control signal, said duty factor determing circuit outputting, in accordance with said PID control signal, a series of switching signals to operate said switching means;
   a pan stopper for restricting the displacement of said weighing pan so that said weighing pan can not go down over a predetermined lowest position; and
   an electronic means for outputting, while said weighing pan rests at said predetermined lowest position, a PID operation modifying signal which causes an increase in a coefficient multiplying at least an integral term contained in mathematical operations carried by said digital PID operation circuit.

2. An electronic balance as defined in claim 1, wherein said PID operation modifying signal is a signal outputted from a comparator which compares said displacement signal with a predetermined reference signal.

3. An electronic balance as defined in claim 1, wherein a predetermined level of said displacement signal is used as said PID operation modifying signal.

* * * * *